(12) United States Patent
Schomacher et al.

(10) Patent No.: US 11,445,861 B2
(45) Date of Patent: Sep. 20, 2022

(54) ELECTRICAL KITCHEN APPLIANCE

(71) Applicant: Vorwerk & Co. Interholding GmbH, Wuppertal (DE)

(72) Inventors: Jutta Schomacher, Wuelfrath (DE); Stefan Kraut-Reinkober, Leverkusen (DE); Andres Sauerwald, Bottrop (DE); Torsten Lang, Solingen (DE); Georg Hackert, Bochum (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 636 days.

(21) Appl. No.: 15/329,688

(22) PCT Filed: Jul. 29, 2015

(86) PCT No.: PCT/EP2015/067429
§ 371 (c)(1),
(2) Date: Jan. 27, 2017

(87) PCT Pub. No.: WO2016/016333
PCT Pub. Date: Feb. 4, 2016

(65) Prior Publication Data
US 2017/0208992 A1 Jul. 27, 2017

(30) Foreign Application Priority Data

Jul. 30, 2014 (DE) .................... 10 2014 110 831.0
Aug. 25, 2014 (DE) .................... 10 2014 112 114.7

(51) Int. Cl.
*A47J 36/32* (2006.01)
*A47J 43/07* (2006.01)
(Continued)

(52) U.S. Cl.
CPC ........ *A47J 43/0716* (2013.01); *A47J 36/321* (2018.08); *A47J 44/00* (2013.01); *F24C 7/08* (2013.01); *A47J 43/07* (2013.01)

(58) Field of Classification Search
CPC ........ A47J 36/32; A47J 43/0716; A47J 43/07; A47J 44/00
See application file for complete search history.

(56) References Cited

U.S. PATENT DOCUMENTS 6,585,516 B1 * 7/2003 Alabaster ........... G09B 19/0092
128/921
2003/0084047 A1 * 5/2003 Williamson ........... G06Q 10/10
(Continued)

FOREIGN PATENT DOCUMENTS

DE 10301526 B3 * 6/2004 .............. A47J 27/04
EP 0971173 A1 * 1/2000 .............. F24C 7/082
(Continued)

OTHER PUBLICATIONS

Google Patents English translation DE10301526; Gunter et al.; downloaded Sep. 18, 2018; pp. 1-7 (Year: 2004).*
(Continued)

*Primary Examiner* — Steven N Leff
(74) *Attorney, Agent, or Firm* — Collard & Roe, P.C.

(57) ABSTRACT

The invention relates to an electrical kitchen appliance for preparing meals, preferably according to predetermined recipes, with an output interface (2) for outputting information data (4) to a user and an input interface (3) for inputting control commands for control of the electrical kitchen appliance (1) by the user, wherein the information data (4) are stored in a memory (5) connected with the electrical kitchen appliance (1). According to the invention, it is provided that a respective time data item (6) and/or location data item (7) is allocated to at least a portion of the information data (4) in the memory (5), and an acquisition
(Continued)

Figure 1:
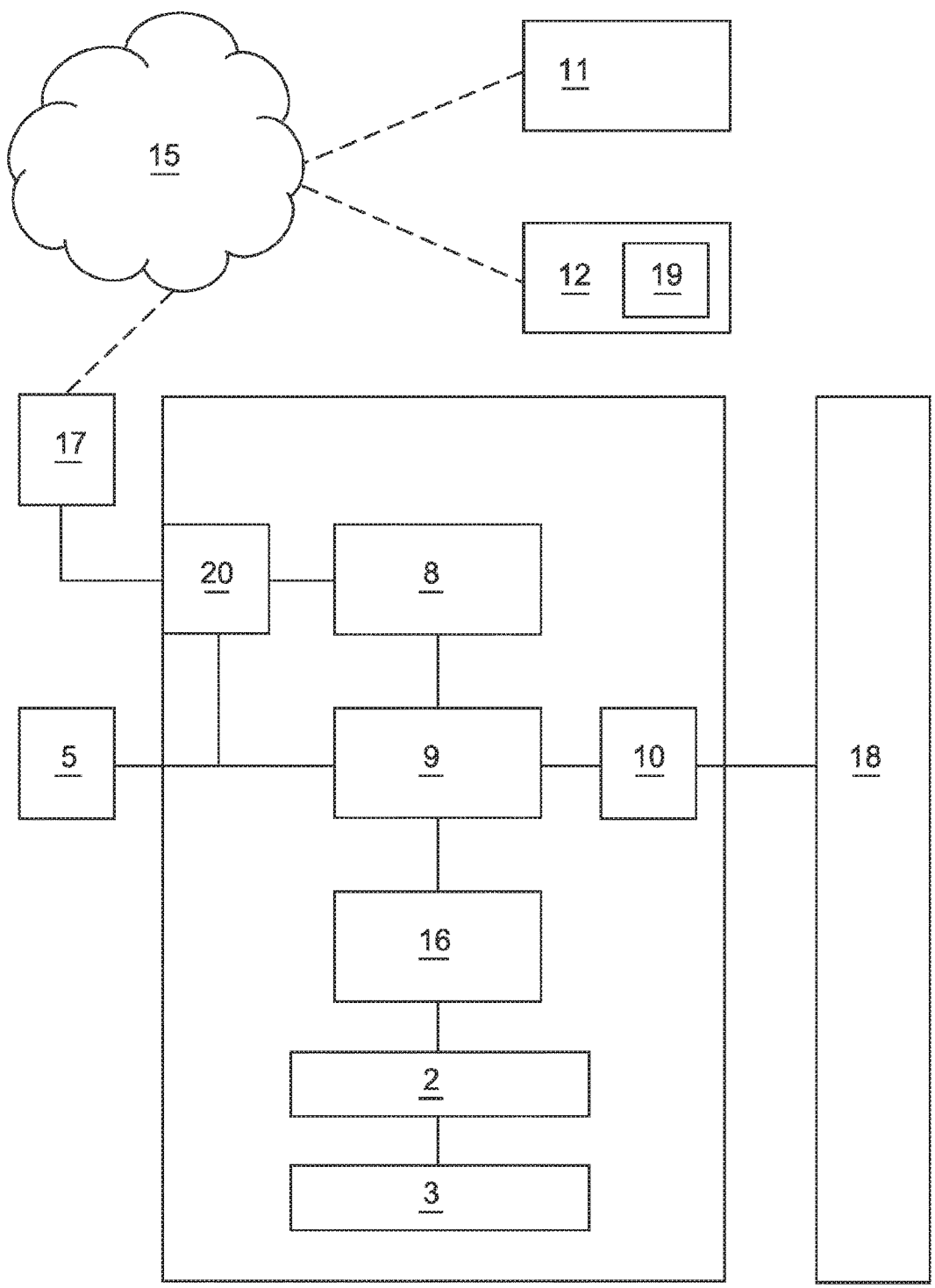

device (8) and selection device (9) are provided, wherein the acquisition device (8) can be used to acquire current time data (13) and/or current location data (14), and the selection device (9) is connected with the memory (5) and acquisition device (8), and further configured so that it can only be used to automatically select and allow for output those information data (4) from the memory (5) that exhibit at least one time data item (6) or location data item (7) that coincides with an acquired current time data item (13) or current location data item (14).

6 Claims, 3 Drawing Sheets

(51) Int. Cl.
*F24C 7/08* (2006.01)
*A47J 44/00* (2006.01)

(56) References Cited

U.S. PATENT DOCUMENTS

| | | | |
|---|---|---|---|
| 2010/0050119 A1* | 2/2010 | Breunig | F24C 7/082 |
| | | | 715/812 |
| 2012/0181266 A1* | 7/2012 | Frommer | F24C 3/12 |
| | | | 219/492 |
| 2015/0305566 A1 | 10/2015 | Koetz | |

FOREIGN PATENT DOCUMENTS

| | | | |
|---|---|---|---|
| EP | 1666798 A2 * | 6/2006 | F24C 7/08 |
| EP | 2 832 275 A1 | 2/2015 | |
| WO | 2014/083029 A1 | 6/2014 | |

OTHER PUBLICATIONS

International Search Report of PCT/EP2015/067429, dated Oct. 9, 2015.

* cited by examiner

ELECTRICAL KITCHEN APPLIANCE

CROSS REFERENCE TO RELATED APPLICATIONS

This application is the National Stage of PCT/EP2015/067429 filed on Jul. 29, 2015, which claims priority under 35 U.S.C. § 119 of German Application No. 10 2014 110 831.0 filed on Jul. 30, 2014 and German Application No. 10 2014 112 114.7 filed on Aug. 25, 2014, the disclosures of which are incorporated by reference. The international application under PCT article 21(2) was not published in English.

The invention relates to an electrical kitchen appliance for preparing meals, preferably according to predetermined recipes, with an output interface for outputting information data to a user and an input interface for inputting control commands for control of the electrical kitchen appliance by the user, wherein the information data are stored in a memory connected with the electrical kitchen appliance.

For example, such electrical kitchen appliances are known in the form of universal food processors, which aside from mechanically processing foods, e.g., by means of an agitator or cutting blade, also makes it possible to cook the foods. Often provided for preparing a corresponding meal are predetermined recipes, which involve several sequential recipe steps. In order to make it easier for the user of this type of electrical kitchen appliance to prepare a meal according to such a predetermined recipe, these types of devices can exhibit an output interface for outputting information to a user. For example, this output interface can be used to prompt the user to introduce a specific quantity of a predetermined food into the device, set a specific mixing stage and/or select a specific cooking stage. An input interface can be provided for inputting corresponding control commands with which the electrical kitchen appliance is controlled, e.g., in the form of a touchscreen.

While these types of kitchen appliances in the past often made do with simple symbols for outputting information to the user, and buttons for inputting control commands were also labeled with corresponding simple symbols, post-cooking of more complex recipes requires more detailed instructions for which simple symbols are often not suited. In particular when outputting commands in text form, however, the problem becomes that different languages are required depending on the local area of operation. In addition, recipe databases for these types of electrical kitchen appliances often exhibit so many recipes that it becomes hard for the user to find a recipe that suits him or her.

Proceeding from the above, the object of the invention is to indicate a type of electrical appliance that enables an automatic adjustment to the requirements of various users.

This object is achieved by the subject matter of claim 1. Preferred embodiments are described in the subclaims.

Therefore, the invention involves an electrical kitchen appliance for preparing meals, preferably according to predetermined recipes, with an output interface for outputting information data to a user, and an input interface for inputting control commands for control of the electrical kitchen appliance by the user, wherein the information data are stored in a memory connected with the electrical kitchen appliance, characterized in that a respective time data item and/or location data item is allocated to at least a portion of the information data in the memory, and an acquisition device and selection device are provided, wherein the acquisition device can be used to acquire time data and/or location data, and the selection device is connected with the memory and acquisition device, and further configured in such a way as to automatically select and allow only those information data from the memory that exhibit at least one data item of the acquired time data or location data.

The term "information" is here used to denote those data that can deliver information to the user of the kitchen appliance according to the invention for using the kitchen appliance, e.g., within the framework of implementing a cooking recipe. Therefore, the terms "information" on the one hand and "information data" on the other are here used with the same meaning. The data corresponding to the information thus represent information data, as distinguished from the addressed location data or time data, which on their part can be allocated to the information data stored in the memory, so that the respective information data can exhibit at least one respective data item, practically in the form of a metadata item.

Time data item here refers to all data that define an absolute or relative point in time or an absolute or relative duration of time. Therefore, a time data item can be "Easter Sunday", "Fridays", "evenings, specifically between 5 and 9 p.m.", "October 3", etc. According to the present invention, a location data item is understood to include all of those data that in whatever form establish a reference to a location. A location data item can thus be "Germany", "Southeast Asia", "Bavaria", "Berlin", etc.

The acquisition device can now be used to acquire time data and/or location data, in particular time data or location data that belong to the current location of the electrical kitchen appliance. For example, the acquisition device can thus be used to determine that it is Easter Sunday, and the electrical kitchen appliance is set up at a location in Germany. With these two metadata items "Easter Sunday" and "Germany", the selection device only allows those information data to be output from the memory that also exhibit "Easter Sunday" or "Germany" as a metadata item.

Therefore, it becomes possible as a whole to specifically provide the user with those types of information data that fit the actual location where the electrical kitchen appliance is set up based on a corresponding designation with location or time metadata items. In the "Easter Sunday" in "Germany" example mentioned above, the user can thus be offered a selection of recipes that were previously provided with the metadata "Easter Sunday" or "Germany", e.g., because German dishes or Easter dishes are involved.

The acquisition device that allows the acquisition of time data or location data can be varyingly configured, as long as it is only able to come into contact with a system that basically enables the provision of a location data item or a time data item. For example, it is preferably provided that the acquisition device exhibit a telephone interface, an internet interface and/or a GPS interface. A telephone interface allows access to a telephone network, such as a public telephone network (PSTN), in which current time data are generally also accessible. In particular given contact to a mobile network, the location can also be determined, at least within a specific local area. The same applies to an internet interface, over which the time servers can be reached, and which enable a local identification via local access to the internet, also within a specific area. The same also holds true for the well-known GPS technology.

It can basically be provided that the selection device always be active, so that it always only allows the selection and output of those types of information data from memory that exhibit at least one data item of the acquired time data and location data. However, a preferred further development of the invention provides a selection device that can be activated by the user, which is designed in such a way as to allow a selection of information data by the selection device only upon activation of the selection device by the user. As a consequence, the user can specifically control whether he or she wishes to basically benefit from all information data present in the memory, or whether he or she wishes to arrive at an initial selection by only allowing those information data in the memory for selection and output that exhibit at least one data item of the acquired time data or location data.

In the aforementioned example with the two metadata items "Easter Sunday" and "Germany", this preferred further development of the invention enables the user to use the electrical kitchen appliance entirely normally with its entire information content on Easter Sunday, or specifically by only allowing German regional dishes that fit with Easter to be offered. In this conjunction, it is especially preferred that the selection device provide a separate selection by time data on the one hand and location data on the other. This means that the user can actuate the selection device in such a way that it uses either only time data or only location data or specifically both time data and location data for the selection of information data from the memory that are suitable for output.

It is basically sufficient for the memory with the information data to be only connected with the electrical kitchen appliance. However, a preferred further development of the invention provides that the memory be provided in or on the electrical kitchen appliance. It is here basically possible that the memory be completely filled with the information data to be made available to the user of the electrical kitchen appliance. However, it is especially preferred that the memory in or on the kitchen appliance be a buffer for temporarily holding data, which can be connected with a remote memory for exchanging the information data. For example, it is provided in this conjunction that all information data that belongs to the electrical kitchen device and could basically be offered by the latter be stored in a memory of a remote server, with which the electrical kitchen appliance can preferably be connected via the internet.

In this way, for example, only portions of these information data of interest to the corresponding user can be retrieved. Even if all information data are retrieved from the remote server and stored temporarily, i.e., for a specific time, in the memory or in the kitchen appliance, the connection to the remote server is advantageous in the sense that information data can always be relayed from there locally to the device, e.g., in the form of regular updates.

Holding data temporarily in the buffer can mean that these data are automatically deleted once the electrical kitchen appliance has been turned off. However, in a preferred further development of the invention, the data remain in the buffer provided on or in the electrical kitchen appliance until they are actively deleted, e.g., by the user or from a distance via the remote server.

A preferred further development of the invention further provides that the location data allocated to the information data be national data, wherein the language in which the respective information data are formulated is a national language of the country corresponding to the national data. By acquiring the location where the kitchen appliance is set up, this embodiment makes it possible to automatically display all information data, such as the recipe data, along with required control commands, in the respective national language, without the user having to make corresponding adjustments during delivery of the device or after delivery of the device. This greatly facilitates device installation, since no corresponding inquiry dialog or corresponding input on the device is required, at least as regards the operating language.

In another additionally preferred further development of the invention, the information data consist of recipe information, and the location data allocated to the recipe information are national data, wherein the origin of the respective recipe corresponds to the region to which the respective national data item refers. This enables the output of regional recipes, such as German national specialties, Bavarian dishes or special dishes for which a city or region is known.

In addition, a preferred further development of the invention provides that the information data consist of recipe information, and the time data allocated to the recipe information are seasonal data, which encompass a predetermined period of time within a calendar year. This makes it possible to offer Autumn dishes or recipes for game dishes when in the right season to reflect the time of year.

The invention will be explained in greater detail below based on a preferred exemplary embodiment with reference to the drawing.

The drawing shows

Figure 2:
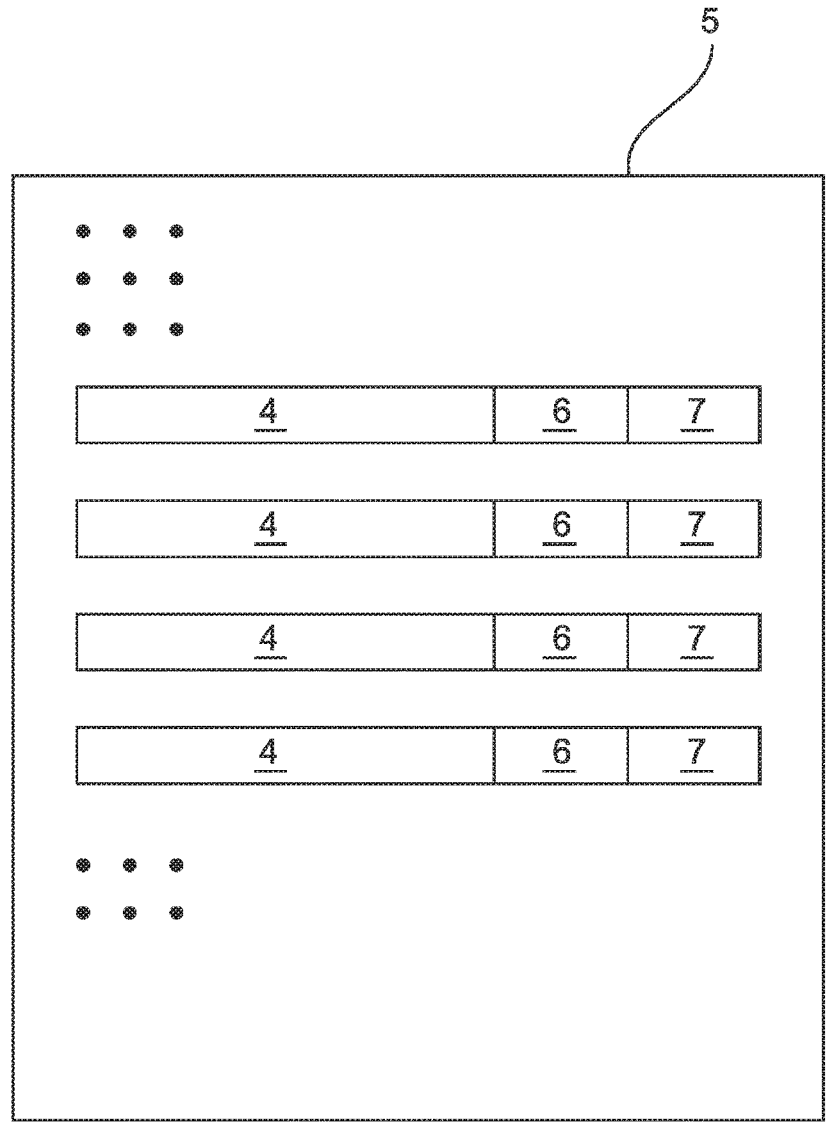
Figure 3:
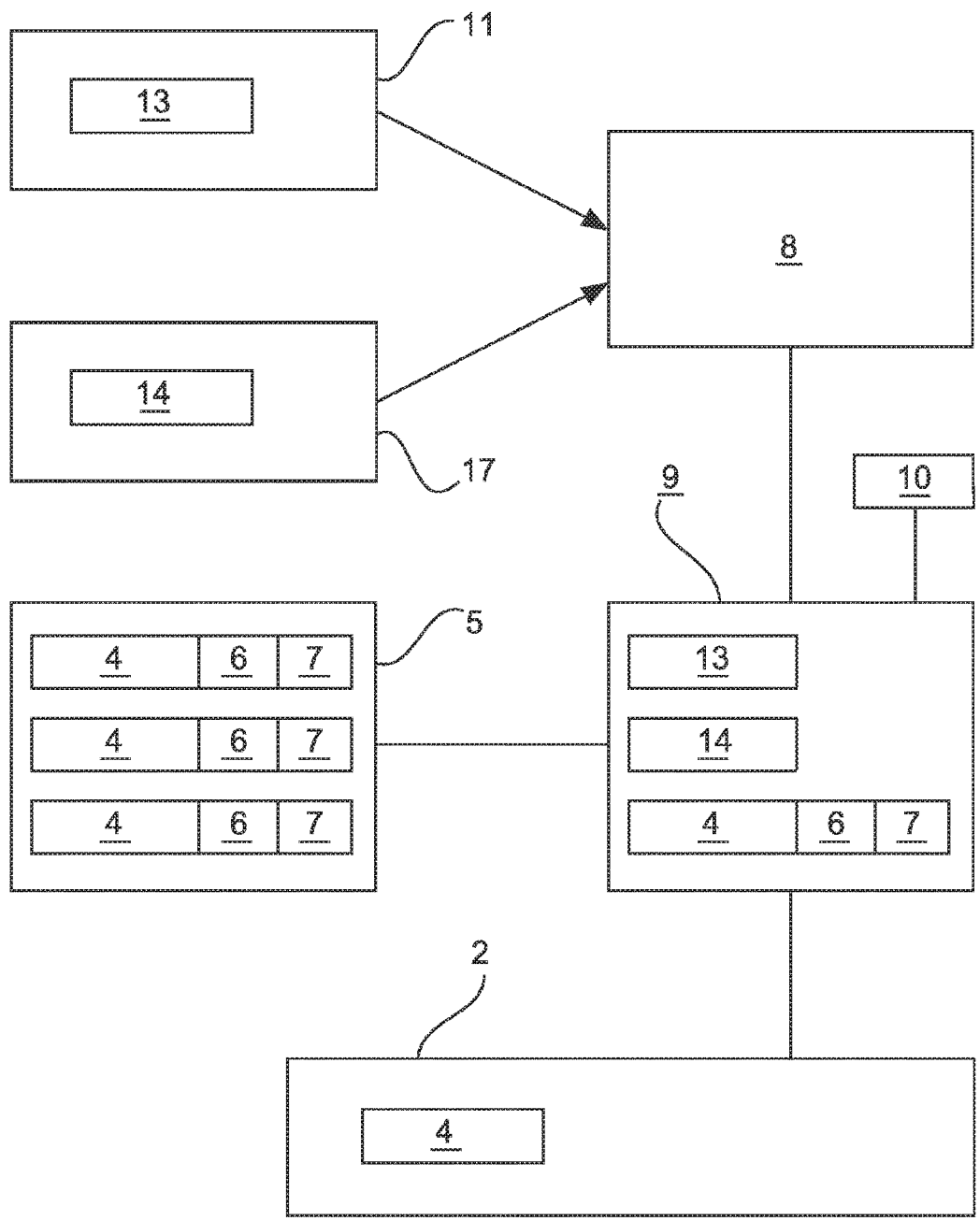

FIG. 1 a schematic view of the structure of an electrical kitchen appliance according to a preferred exemplary embodiment of the invention, which is connected via the internet with a remote server for exchanging information data and a time server for acquiring time data, FIG. 2 is a schematic view of the memory of the electrical kitchen appliance according to the preferred exemplary embodiment of the invention with information data, time data and location data, and FIG. 3 a schematic view of the functioning of the acquisition device of the electrical kitchen appliance according to the preferred exemplary embodiment of the invention.

Visible on FIG. 1 is the schematic structure of an electrical kitchen appliance according to a preferred exemplary embodiment of the invention. The electrical kitchen appliance 1 exhibits an output interface 2 for outputting information data 4 to a user, and an input interface 3 for inputting control commands for control of the electrical kitchen appliance 1 by the user. Further provided is a memory 5 that is connected with the electrical kitchen appliance 1. Provided in the electrical kitchen appliance 1 is a selection device 9 that can be connected with the memory 5, and on its part is connected with an activation device 10 as well as an acquisition device 8.

The electrical kitchen appliance 1 according to the presently described preferred exemplary embodiment of the invention is used to prepare dishes according to predetermined recipes. To this end, the electrical kitchen appliance 1 is provided with a processing unit 18, which exhibits a container for receiving the food to be processed with an agitator, a cutting blade and a cooking device. This processing unit 18 essentially corresponds to the one provided in conventional electrical kitchen appliances for processing the food. For this reason, the individual components of the processing unit 18, such as the container, agitator, cutting blade and cooking unit are not depicted in any greater detail.

A central control device 16 (CPU) is used to control the electrical kitchen appliance 1, i.e., to actuate the aforementioned devices of the processing unit 18 and control and link together the output interface 2, input interface 3 along with the acquisition device 8 and selection device 9. The central control device 16 is used to process the control commands input into the electrical kitchen appliance 1 via the input interface 3 and relayed to the corresponding addresses in such a way that the foods can resultantly be processed in the processing unit 18 as desired. Acting together with the acquisition device 8 and selection device 9, the central control device 16 also controls the display on the output interface 2 in terms of the information data 4 for the user to be output by the latter.

As further evident from FIG. 1, the electrical kitchen appliance is connected via the internet 15 with a remote server 12, as well as with a time server 11. The remote server 12 exhibits a memory 19, which is provided with a plurality of information data 4. These information data 4 can be exchanged via the internet 15 with the memory 5 provided on the electrical kitchen appliance 1.

The electrical kitchen appliance 1 according to the presently described preferred exemplary embodiment of the invention exhibits an internet interface 20 for connection with the internet 15. The latter is in turn connected with an internet router 17, which provides access to the internet 15 for the electrical kitchen appliance 1. The memory 5 can be detached from the electrical kitchen appliance 1 or connected thereto, wherein the memory 5 is equipped with known USB technology in the presently described preferred exemplary embodiment of the invention. As already touched upon, the memory 5 can be connected via the internet with the remote server 12. In this regard, it is possible for the memory 5 to receive data from the memory 19 of the remote server 12, which can then at least be temporarily stored in the memory 5.

In this way, operating the electrical kitchen appliance 1 according to the preferred exemplary embodiment of the invention does not require that there be a constant connection to the internet 15, and hence to the remote server 12 with its memory 19. Therefore, the electrical kitchen appliance 1 can be operated in a "standalone" mode. However, if the electrical kitchen appliance 1 is connected with the internet 15, the content of the memory 5 can be changed via the remote server 12, so that new recipe data can be downloaded or the memory 5 can be updated, for example.

The structure of the data stored in the memory 5 is schematically depicted on FIG. 2, at least for a portion of the data. As shown therein, a plurality of information data 4 are stored in the memory 5, wherein additional data are allocated to these information data 4 in practically the form of "metadata", specifically a respective time data item 6 and a location data item 7. The term "time data item" here refers to those types of data that define an absolute or relative point in time or an absolute or relative duration of time, such as "Easter Sunday", "Friday", etc. The term "location data item" is understood as meaning those types of data that establish a reference to a location, such as "Germany", "Bavaria", "Berlin", etc.

The following now applies with respect to the information data 4 on the one hand and the time data 6 and location data 7 on the other: For example, the information data 4 encompass those types of data that are required for implementing a recipe stored in the memory 5 for processing foods in the processing unit 18 of the electrical kitchen appliance 1. These types of information data can be output to the user of the electrical kitchen appliance 1 via the output interface 2, e.g., in text form, and here read as follows: "Select mixing stage 4", "Set 100° C." or "Add 100 g sugar". Therefore, this information is used by the user of the electrical kitchen appliance 1 according to the presently described preferred exemplary embodiment of the invention for implementing a recipe stored in the memory 5. In order to be able to satisfy the personal requirements of the user even further, an operation of the electrical kitchen appliance 1 according to the preferred exemplary embodiment of the invention is now provided, as schematically depicted on FIG. 3.

The acquisition device 8 and selection device 9 play an essential role in further adjusting the electrical kitchen appliance 1 according to the presently described preferred exemplary embodiment of the invention to the requirements of its user. This is because the acquisition device 8 can be used to acquire current time data 13, such as the current time of day at the location where the electrical kitchen appliance 1 is being set up, along with the current date, from which the current day of the week can be derived, along with the respective time of year, for example. It can further be determined whether the current day is a holiday, for example.

Naturally, when determining a holiday, it is crucial in particular where the electrical kitchen appliance 1 according to the preferred exemplary embodiment of the invention is set up. To this end, the acquisition device 8 is additionally able to acquire current location data 14, such as a country, a region or even a city. According to the present preferred exemplary embodiment of the invention, this acquisition of current location data 14 takes place via the internet router 17, by way of which the electrical kitchen appliance 1 is connected with the internet 15. Similarly to logging into a communication cell of a mobile network, it is generally the case when accessing the internet to use an internet router 17 located in proximity to the participant wishing to access the internet 15, i.e., the electrical kitchen appliance 1 in the case at hand. At least subject to some uncertainty, this makes it possible to use the internet router 17 to acquire a current location data item 14 for the location where the electrical kitchen appliance 1 is set up.

Current time data 13 can be acquired by way of a time server 11, which can also be reached via the internet 15. These types of time servers exist at different operators, and as a rule deliver the current time for each location in the world to the nearest second. In conjunction with the location where the electrical kitchen appliance 1 is set up, which was determined via the current location data 14 by way of the internet router 17, current time data 13 for the electrical kitchen appliance 1 can also be acquired in this way.

The acquisition device can now provide the selection device 9 with this information, i.e., the current time data 13 and current location data 14, wherein the current time data 13 and current location data 14 are transmitted to the selection device 9. However, the selection device 9 is connected not just with the acquisition device 8, but also with the memory 5 provided on the electrical kitchen appliance 1, in which are stored the information data 4, as described above.

The process now continues in the selection device 9 by having the latter, once activated by the user of the electrical kitchen appliance 1, perform a comparison of the current time data 13 and/or current location data 14 with the time data 6 or location data 7 allocated to the information data 4 in the memory 5 as metadata. This type of comparison, and hence a selective choosing of information data 4 stored in the memory 5, is initiated by the user of the electrical kitchen appliance 1 via the activation device 10, which is connected with the selection device 9. Specifically, the user can use the activation device 10 to set whether or not to even carry out a selection, and hence a comparison, of the current time data 13 or current location data 14 with the metadata time data item 6 and location data item 7 to the information data 4 in the memory 5 of the electrical kitchen appliance 1. In addition, the activation device 10 can also be used to set whether a comparison is to take place only with respect to the location data 7 or time data, or with respect to both data 6, 7.

When proceeding in this way, then, the selection device 9 ensures that it only permits those types of information data 4 from the memory 5 to be output on the output interface 2 for which there are correlations between the metadata time data item 6 or location data item 7 and the current time data 13 or current location data 14. In addition to automatically setting the language in which the output interface 2 and input interface 3 are to be operated (German, English, . . . ), this approach also makes it possible to choose certain recipes that are of special interest to the user of the electrical kitchen appliance 1 based on the current location where the electrical kitchen appliance 1 is set up, or based on the day of the week, a specific holiday or the respective current season.

REFERENCE LIST

1 Electrical kitchen appliance
2 Output interface
3 Input interface
4 Information data
5 Memory
6 Time data item
7 Location data item
8 Acquisition device
9 Selection device
10 Activation device
11 Time server
12 Remote server
13 Current time data
14 Current location data
15 Internet
16 Central control device
17 Internet router
18 Processing unit
19 Memory of remote server
20 Internet interface

The invention claimed is:

1. An electrical food processor for preparing meals according to predetermined recipes, the electrical food processor comprising:
   a cooking unit,
   a container,
   an agitator configured to agitate food in the container according to one or more recipe steps,
   a central control device configured for controlling operations of the electrical food processor while implementing a predetermined recipe, the operations comprising operating the agitator and the cooking unit,
   an output interface connected to the central control device and being configured for outputting information data to a user, the information data being recipe steps relating to operations of the agitator for using the food processor by a user within the framework of implementing a recipe, wherein the output interface prompts the user to introduce a specific quantity of a predetermined food into the apparatus and/or set a specific mixing stage,
   an input interface connected to the central control device and being configured for inputting control commands for control of the electrical food processor by the user,
   a memory for storing the information data, the memory being connected with the electrical food processor, wherein a respective time data item and/or location data item is allocated to at least a portion of the information data in the memory,
   an acquisition device configured to acquire current time data and/or current location data, and
   a selection device connected with the memory and acquisition device, and further configured to perform the steps of
      automatically selecting from the memory only the information data that exhibit at least one time data item or location data item that coincides with an acquired current time data item or with an acquired current location data item, the acquired current time data item or the acquired current location data item having been acquired by the acquisition device, and
      outputting the selected information data via the output interface,
   wherein the selection device is designed to allow a separate selection by time data and location data, such that the user can actuate the selection device in such a way that the selection device uses either only time data or only location data or both time data and location data for the selection of information data from the memory that are suitable for output,
   wherein the selection device comprises an activation device, with which the selection device can be activated and deactivated by the user, thereby enabling the selection device to choose the information data only after the selection device has been activated by the user,
   wherein when the selection device is activated via the activation device, only those information data in the memory are output that exhibit at least one data item of the acquired time data or of the acquired location data,
   wherein when the selection device is deactivated via the activation device, all information data in the memory can be output to the output interface, and
   wherein the acquisition device comprises a telephone interface, an internet interface and/or a GPS interface.

2. The electrical food processor according to claim 1, wherein the memory is provided in or on the electrical food processor.

3. The electrical food processor according to claim 2, wherein the memory in or on the food processor is a buffer for temporarily holding data, which can be connected with a memory of a remote server for exchanging the information data.

4. The electrical food processor according to claim 1, wherein the location data allocated to the information data are at least partially national data, and
   wherein the language in which the respective information data are formulated is a national language of the country corresponding to the national data.

5. The electrical food processor according to claim 1, wherein the information data comprises at least partially recipe information data, and the location data allocated to the recipe information data encompass national data, and
   wherein the origin of the respective recipe corresponds to the region to which the respective national data item refers.

6. The electrical food processor according to claim 1, wherein the information data comprises recipe information data, and the time data allocated to the recipe information data are seasonal data, which encompass a predetermined period of time within a calendar year.

* * * * *